US012622547B2

(12) United States Patent
Quaratesi et al.

(10) Patent No.: US 12,622,547 B2
(45) Date of Patent: May 12, 2026

(54) GRINDING DEVICE

(71) Applicant: DE' LONGHI APPLIANCES S.R.L. CON UNICO SOCIO, Treviso (IT)

(72) Inventors: Guido Quaratesi, Treviso (IT); Emanuele Marcato, Treviso (IT)

(73) Assignee: DE' LONGHI APPLIANCES S.R.L. CON UNICO SOCIO, Treviso (IT)

( * ) Notice: Subject to any disclaimer, the term of this patent is extended or adjusted under 35 U.S.C. 154(b) by 392 days.

(21) Appl. No.: 18/018,910

(22) PCT Filed: Jul. 13, 2021

(86) PCT No.: PCT/IT2021/050217
§ 371 (c)(1),
(2) Date: Jan. 31, 2023

(87) PCT Pub. No.: WO2022/024153
PCT Pub. Date: Feb. 3, 2022

(65) Prior Publication Data
US 2023/0284833 A1      Sep. 14, 2023

(30) Foreign Application Priority Data
Jul. 31, 2020      (IT) ......................... 102020000018922

(51) Int. Cl.
A47J 42/50      (2006.01)
A47J 42/06      (2006.01)
A47J 42/40      (2006.01)

(52) U.S. Cl.
CPC .............. *A47J 42/50* (2013.01); *A47J 42/06* (2013.01); *A47J 42/40* (2013.01)

(58) Field of Classification Search
CPC .. A47J 42/00; A47J 42/02; A47J 42/06; A47J 42/10; A47J 42/12; A47J 42/38; A47J 42/40; A47J 42/50; A47J 31/42; B02C 2/007; B02C 23/02
See application file for complete search history.

(56) References Cited

U.S. PATENT DOCUMENTS

2020/0154935 A1* 5/2020 Foglia ................. A47J 31/3671
2020/0315401 A1* 10/2020 Deuber ................... A47J 42/46

FOREIGN PATENT DOCUMENTS

| | | | | |
|---|---|---|---|---|
| AU | 2009202486 A1 | | 1/2010 | |
| AU | 2009202515 | * | 1/2010 | .............. A47J 42/50 |
| CA | 2930844 C | * | 6/2019 | .............. A23F 5/26 |
| EP | 2409610 A1 | | 1/2012 | |
| GB | 725532 A | * | 3/1955 | .............. A47J 42/38 |
| WO | 2014026485 A1 | | 2/2014 | |
| WO | 2019122397 A1 | | 6/2019 | |

OTHER PUBLICATIONS

Johnson et al., Apparatuses, Systems, and Methods for Brewing a Beverage (Year: 2019).*
International Search Report for corresponding application PCT/IT2021/050217 filed Jul. 13, 2021; Mail date Oct. 26, 2021.
Written Opinion for corresponding application PCT/IT2021/050217 filed Jul. 13, 2021; Mail date Oct. 26, 2021.

* cited by examiner

*Primary Examiner* — Christopher L Templeton
(74) *Attorney, Agent, or Firm* — K&L Gates LLP

(57) ABSTRACT
A grinding device for grinding food products, comprises a housing compartment, grinding means and a hopper removably associated with the housing compartment, wherein the hopper comprises a container having at least one selectively openable and closable lower aperture.

15 Claims, 4 Drawing Sheets

GRINDING DEVICE

FIELD OF THE INVENTION

Embodiments described here concern a grinding device provided with a hopper for loading the products to be ground, which can be removed from a containing body of the grinding device. Embodiments described here also concern a method to remove the hopper from the containing body and insert it back inside it.

BACKGROUND OF THE INVENTION

Grinding devices for domestic or professional use are known, which can be used for grinding, shredding or crushing different types of food products, such as for example cereals, seeds, coffee beans, or dried fruit, such as walnuts, almonds, hazelnuts and suchlike, to obtain a powder with a certain granulometry, or other foods such as for example carrots, basil, and suchlike, to finely chop them.

Grinding devices can be integrated into other household appliances, such as for example a machine for preparing beverages, or they can be made as autonomous components and accessories.

Normally, in grinding devices, whether they are integrated into household appliances, or "stand alone", the grinding means are integrated inside a machine body, and a fixed hopper is provided to feed the products to be ground, which is accessible from outside the machine body.

One disadvantage of machines with a fixed hopper is that they make cleaning and maintenance difficult.

Another disadvantage is that they do not allow to easily and frequently change the type of product to be ground, as this entails manual emptying of the hopper and of the grinding means.

To try to solve the problems related to cleaning, machines for preparing beverages have been made, provided with a grinding device integrated in the machine body and with a removable hopper. These known solutions generally comprise a knob positioned inside the hopper, which can be rotated manually to close one or more holes for the passage of the beans provided on the bottom and simultaneously release the hopper from the machine body.

One disadvantage of these known machines is that to access the knob, the user has to necessarily insert his/her hands inside the hopper. These solutions are therefore impractical and unhygienic.

Other known solutions provide a mobile closing plate positioned below the bottom of the hopper, which can be moved by means of a slider to close a passage opening for the coffee beans. This solution is also not very functional, since the slider is normally positioned laterally with respect to the hopper and is not always easily accessible for the user.

Known solutions are in particular intended to allow the grinding means to be cleaned and maintained, but do not allow to frequently and quickly change the type of coffee beans to be used.

Moreover, these known machines generally allow the grinding means to start only when the hopper is in the assembled position and the passage aperture for the beans is open. In this way, however, if the user wants to change the type of coffee beans, contamination occurs between the old and the new type of beans.

In the field of machines for preparing coffee, on the other hand, it would be preferable to be able to allow an easy and quick replacement of the coffee beans present in the hopper, to allow the preparation of types of coffee with different aromas.

There is therefore a need to perfect a grinding device with a respective hopper which can overcome at least one of the disadvantages of the state of the art.

In particular, one purpose of the present invention is to provide a grinding device provided with a hopper which can be removed simply and quickly.

Another purpose of the present invention is to provide a hopper which can be removed from the machine body without the user having to touch the food products inside it.

Another purpose of the invention is to perfect a grinding device which allows to change the type of food products to be ground, preventing contamination between the old and the new product.

Another purpose of the invention is to provide a grinding device that is safe for the user.

Another purpose is to perfect a method to remove and insert a hopper from/into a machine body of a grinding device which allows these operations to be performed quickly, effectively, and hygienically, at the same time guaranteeing the safety of the user.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, a grinding device provided with a removable hopper is provided, which overcomes the limits of the state of the art and eliminates the defects present therein.

In accordance with some embodiments, the grinding device comprises a containing body provided with a housing compartment, grinding means contained inside the containing body and a removable hopper positioned above the grinding means and associated, during use, with the containing body.

According to some embodiments, the hopper comprises a container provided with an upper aperture and a bottom wall having at least one lower aperture, and a closing device connected to the container in a mobile manner.

The container can assume at least a first position in which the lower aperture is open and allows the transit of the products to be ground toward the grinding means, and at least a second position in which it closes the at least one lower aperture and therefore the bottom of the hopper.

In this way, it is possible to remove the hopper from the housing compartment, preventing unwanted spillages of the products to be ground.

According to some embodiments, the container has a cylindrical shape, substantially symmetrical with respect to a vertical axis.

The container and the closing device are constrained to each other in an axial direction along the vertical axis, but are free to rotate with respect to each other around the axis as above.

According to some embodiments, the closing device comprises a lower wall provided with at least one through hole which, in the first position, is located below the at least one lower aperture; two or more through holes can also be provided angularly distanced with respect to the vertical axis and configured to be positioned in correspondence with respective two or more lower exit apertures.

According to one aspect of the invention, the closing device comprises first coupling members suitable to couple with respective and mating second coupling members provided in the housing compartment in order to clamp the closing device and the housing compartment in reciprocal position.

The hopper also comprises clamping members configured to cooperate with respective clamping seatings provided in the housing compartment.

According to some embodiments, the clamping members are constrained to the containing body and their drive occurs by means of rotation of the containing body with respect to the closing device.

According to some embodiments, the clamping members are associated with the closing device and are configured to pass from a first inactive position in which they are enclosed inside the closing device, to a second active position in which they at least partly protrude from the closing device in a radial direction through suitable slots made in a lateral wall thereof and engage with the clamping seatings.

According to these embodiments, the clamping members comprise at least one pin configured to slide on a respective guide provided on the lower wall of the closing device.

Preferably, two pins are provided suitable to slide on respective guides, which are substantially symmetrical with respect to the vertical axis.

According to one variant, the clamping members and the clamping seatings are configured to make a bayonet-type coupling between them. According to this variant, the clamping members are associated with the containing device and comprise at least one pin protruding radially from a lower portion of the container, and the closing device circumferentially has a through slot suitable for the clamping members to pass and slide through it, in such a way as to allow them to couple with the clamping seatings.

According to some embodiments, in the housing compartment there is provided at least a first detection device configured to detect the presence of the hopper inside the housing compartment.

The presence detection device can be disposed in correspondence with a second coupling member of the housing compartment and be configured to be activated by a first coupling member of the clamping device when it engages with it.

According to some embodiments, the grinding device comprises at least one device for detecting the opened/closed state configured to detect when the lower aperture is in at least one of either the open position in which the passage of the products toward the grinding means is allowed, or the closed position.

According to some embodiments, the at least one state detection device can be disposed in correspondence with a clamping seating of the housing compartment, defining an end of travel position for the clamping members, and be configured to be activated by a clamping member of the closing device when it is engaged in this seating.

Providing two distinct detection devices to detect the presence and the opened state of the passage of the products advantageously allows to be able to drive the grinding means while keeping the passage aperture closed, so as to be able to perform a function of emptying the grinding chamber before introducing a new product into it.

This function can be particularly advantageous in the case of a grinding device associated with a machine for preparing coffee, since it allows to not mix different types of beans together, which could lead to a non-optimal beverage. In this way, a highly versatile grinding device can be obtained, which allows to continuously change the type of coffee beans, allowing a high degree of personalization of the beverage by the user, substantially similar to what happens in pod machines in which it is possible to change the type of aroma desired for each beverage.

This advantage is generally obtained whenever it is required to grind different types of products one after the other, since it is possible to replace or load the hopper with a new product before having completely emptied the grinding chamber in which the previous product is still present, and then proceed to empty the latter before opening the lower apertures.

According to some embodiments, the state detection device can be configured to detect both the completely opened state and the completely closed state of the lower apertures. In this way, intermediate positions are avoided which would lead on the one hand to an only partial clamping of the hopper in the housing compartment, and on the other hand to a partial opening of the lower apertures which would neither allow a correct feed of the products to be ground, nor a safe removal of the hopper without unwanted spillages of the products.

According to some embodiments, two state detection devices can be provided, respectively located in a start of travel position and an end of travel position corresponding to the inactive position and to the active position of the clamping members.

BRIEF DESCRIPTION OF THE DRAWINGS

These and other aspects, characteristics and advantages of the present invention will become apparent from the following description of some embodiments, given as a non-restrictive example with reference to the attached drawings wherein.

Figure 2:
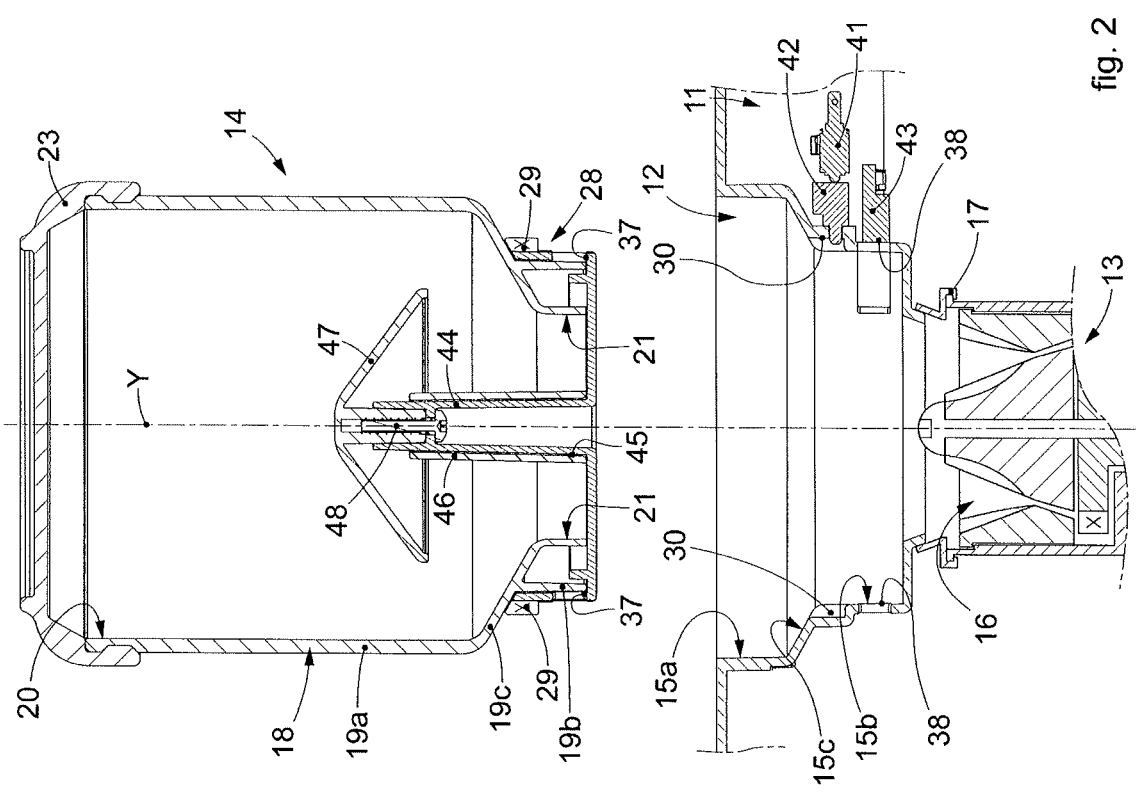
FIG. 2 is a partial section view of the grinding device of FIG. 1 with the extractable hopper separated from the machine body.

To facilitate comprehension, the same reference numbers have been used, where possible, to identify identical common elements in the drawings. It is understood that elements and characteristics of one embodiment can conveniently be combined or incorporated into other embodiments without further clarifications.

DETAILED DESCRIPTION OF SOME EMBODIMENTS

We will now refer in detail to the possible embodiments of the invention, of which one or more examples are shown in the attached drawings, by way of a non-limiting illustration. The phraseology and terminology used here is also for the purposes of providing non-limiting examples.

Some embodiments described here concern a grinding device 10, of the domestic or professional type, preferably of the type suitable to grind food products. With the terms grinding, grind and suchlike, here and hereafter in the description we mean both operations to pulverize and also operations to shred and crush a product.

The grinding device 10 in question can be made as an autonomous or stand alone component, or it can be integrated in a machine or household appliance.

The grinding device 10 can be for example a coffee grinder, suitable to grind coffee beans, or it can be suitable to grind dry food products, for example dried fruit such as hazelnuts, chestnuts, walnuts, almonds and suchlike, or cereals such as rice, grains of corn or even different food products, such as for example olives, carrots, or tomatoes in order to obtain oil or ground pulp.

The grinding device 10 comprises a hopper 14 to feed the products to be ground to the grinding means 13 disposed inside a containing body 11 provided with a housing compartment 12 in which the hopper 14 is attached in a removable manner.

In the case of a grinding device 10 of the stand alone type, the containing body 11 can be a cover, or a casing of the device, while in the case of a grinding device 10 integrated in an apparatus, or a machine, for example a machine for preparing coffee, the containing body 11 can coincide with that of the apparatus or machine.

The housing compartment 12 can have a funnel shape comprising a first cylindrical portion 15a and a second cylindrical portion 15b both connected by an intermediate portion 15c with a truncated cone shape.

Depending on the different applications of the grinding device 10, grinding means 13 of different types can be provided.

By way of example, the grinding means 13 can comprise a pair of grinders rotating with respect to each other, for example a rotating grinder and a non-rotating grinder which are coaxial with respect to an axis and delimit an interstice, where the grinding is carried out, the width of which determines the granulometry of the powder obtained.

According to possible variants, the grinding means 13 can comprise one or more rotating blades.

According to some embodiments, the grinding device 10 comprises a grinding chamber 16, configured to accommodate the products to be ground, and inside which the grinding means 13 are provided, said grinding chamber 16 being located in communication with the housing compartment 12.

A packing 17 can be provided between the grinding chamber 16 and the housing compartment 12 which ensures the connection and guarantees the seal between the two components.

According to some embodiments, for example described with reference to FIG. 3, the hopper 14 comprises a container 18, provided with an upper aperture 20 for the introduction of the products to be ground, and at least one lower aperture 21 through which the products to be ground can be fed to the grinding chamber 16.

The container 18 can have a cylindrical shape, substantially symmetrical with respect to a central axis Y which, during use, is vertical.

The container 18 can have a section with a variable diameter, decreasing between the upper portion 19a and a lower portion 19b, having a shape and sizes correlated to those of the housing compartment 12.

In particular, the upper portion 19a and the lower portion 19b have a cylindrical shape and are connected to each other by an intermediate portion 19c with a truncated cone shape.

According to some embodiments, the upper aperture 20 can coincide with the section of the upper portion 19a and be delimited by an upper edge thereof, while the at least one lower aperture 21 can be smaller than the section of the lower portion 19b of the container 18 and be made in a bottom wall 22 thereof.

According to some embodiments, there can be provided two lower apertures 21 made through in the bottom wall 22 of the container 18, for example disposed symmetrical with respect to a plane passing through the central axis Y.

The hopper 14 can comprise a closing cap 23 configured to close the upper aperture 20, which can be completely separable from the container 18, or be hinged to it.

The closing cap 23 can be connected to the container 18 by means of a same shape coupling, screwing, or other coupling means.

According to some embodiments, the hopper 14 also comprises a closing device 24 associated with the container 18 in correspondence with the bottom wall 22.

The closing device 24 and the container 18 are constrained to each other in the axial direction, but can rotate with respect to each other around the central axis Y.

According to some embodiments, the closing device 24 comprises a lower wall 25 provided with at least one through hole 27.

The closing device 24 also comprises a lateral wall 26 with a shape and size mating with those of the lower portion 19b of the container 18 and suitable to be positioned coaxially outside the latter.

According to some embodiments, the at least one through hole 27 can have a shape correlated to that of the lower aperture 21.

According to some embodiments, there can be provided two lower apertures 21 diametrically opposite each other, and two through holes 27 mating therewith.

According to some embodiments, the container 18 can rotate with respect to the closing device 24 in such a way as to assume a first position in which the at least one through hole 27 is positioned below the lower aperture 21, and a second position in which the lower wall 25 is disposed below the lower aperture 21, and the passage of the products to be ground is prevented.

For example, the container 18 can rotate by an angle of about 90° to pass from the first to the second position, and vice versa.

The closing device 24 and the container 18 can be provided with respective axial connection members.

For example, the connection members can comprise a first tubular element 44 protruding from the lower wall 25 of the closing device 24, and a second tubular element 46 which extends inside the container 18 from a central hole 45 made in the bottom wall 22, with a shape mating with that of the first tubular element 44 and configured to accommodate it inside it.

The first 44 and the second tubular element 46 can be connected to each other by means of removable attachment members, for example a screw disposed along the central axis Y to allow the reciprocal rotation with respect to it.

According to some embodiments, inside the container 18 there can also be provided a protection element 47, also called "finger guard", configured to prevent a user, when inserting his/her hands inside the container 18, from coming into contact with the cutting means of the grinding devices 13 located below the lower apertures 21.

According to some embodiments, the closing device 24 and the housing compartment 12 are provided with respective coupling members 28 configured to cooperate with each other in such a way as to allow a reciprocal coupling in the axial direction along the central axis Y, while preventing a reciprocal rotation around it.

According to some embodiments, the coupling members 28 can comprise at least one fin 29 protruding radially from the lateral wall 26, and at least one mating cavity or groove 30 disposed in the housing compartment 12.

According to possible variants, there can be two or more fins 29, each suitable to be inserted in its own cavity or groove 30, disposed angularly offset from each other.

According to a possible alternative embodiment, it can also be provided that protruding fins are provided inside the housing compartment 12, suitable to cooperate with respective cavities or grooves present on the closing device 24.

According to some embodiments, the hopper 14 comprises clamping members 31 configured to cooperate with clamping seatings 38, 138 provided in the housing compartment 12 to reciprocally clamp the two components.

The clamping members 31 are constrained to the container 18 and are driven by means of a rotation of the container 18 around the central axis Y, while the closing device 24 is kept fixed in the housing compartment 12.

The clamping members 31 can assume, in cooperation with the housing compartment 12, a first inactive position in which they do not interfere with it, allowing the insertion/removal of the hopper 14, and an active position in which they do interfere with the housing compartment 12 preventing the removal of the hopper 14.

In order to clamp the hopper 14 in the housing compartment 12 it is sufficient to rotate the container 18 in a first sense, so as to take the clamping members 31 from the inactive position to the active position, engaging them in the respective clamping seatings 38, 138.

In order to release the hopper 14 it is sufficient to rotate the container 18 in the opposite sense until the clamping members 31 are returned to the inactive position and subsequently axially lift the hopper 14.

Figure 1:
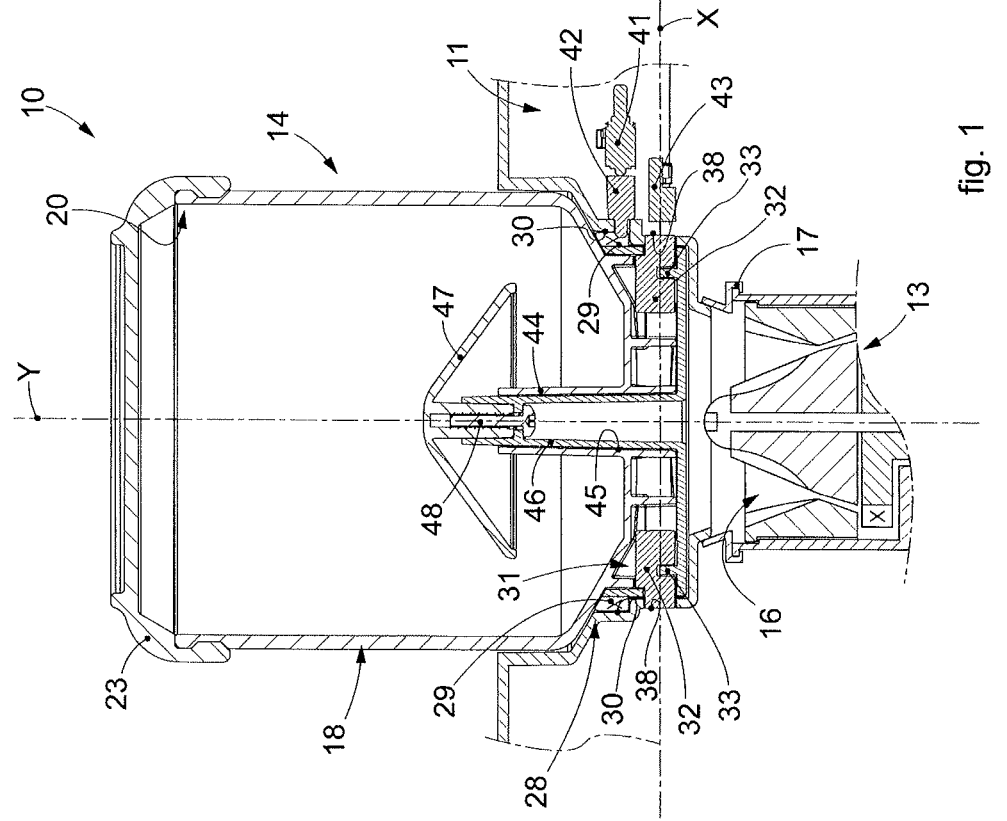
FIG. 1 is a partial section view of a grinding device according to some embodiments described here in the assembled condition.
Figures 5, 6, 7, 8:
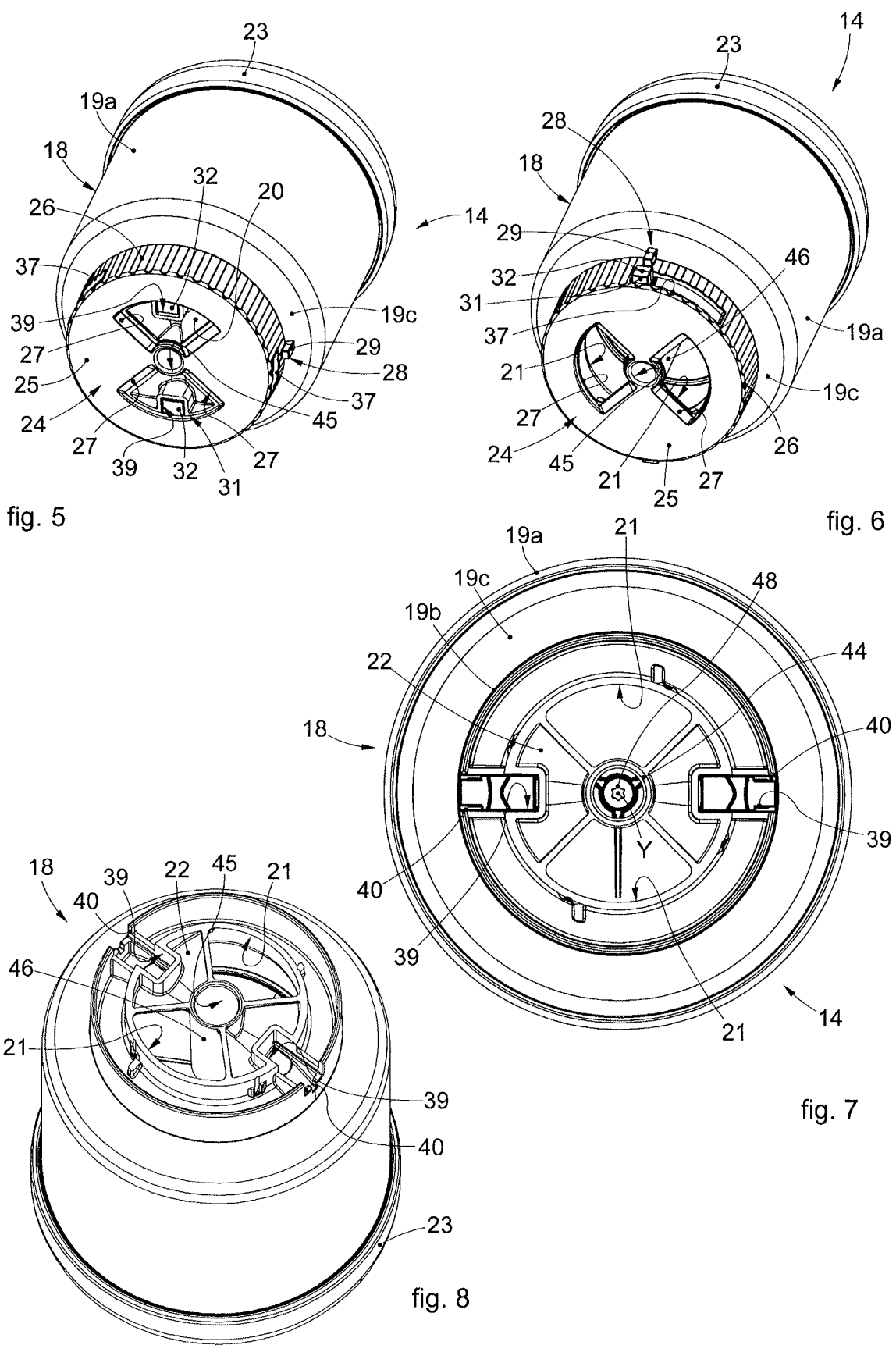
FIG. 5 is a three-dimensional bottom view of the hopper according to the first embodiment with the passage holes in a closed configuration.
FIG. 6 is a three-dimensional bottom view of the hopper of FIG. 5 with the passage holes in an open configuration.
FIG. 7 is a bottom view of the container of the hopper of FIG. 3.
FIG. 8 is a three-dimensional bottom view of the container of FIG. 7.
Figures 9, 10, 11, 12:
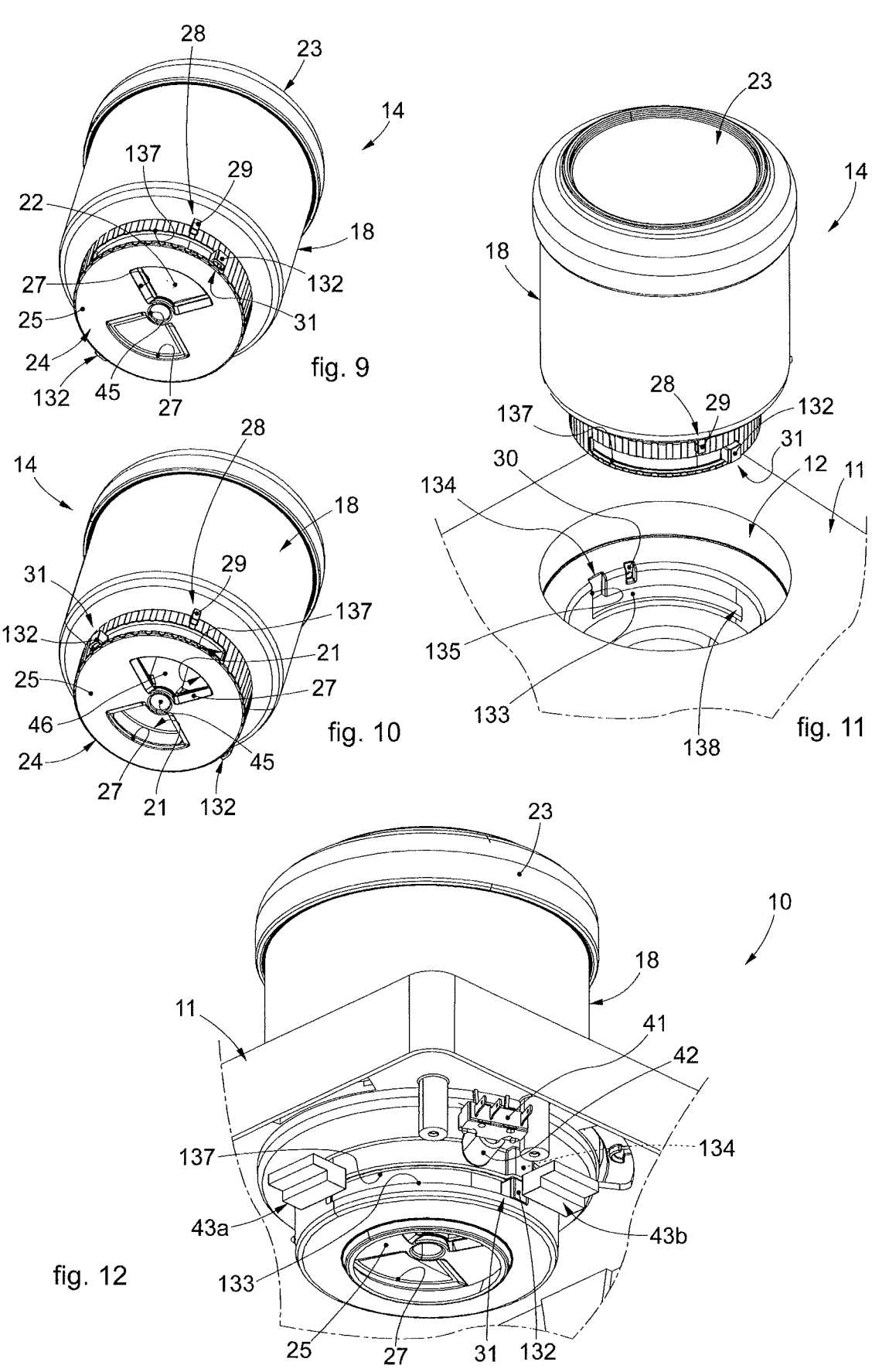
FIG. 9 is a three-dimensional bottom view of the hopper according to a second embodiment with the passage holes in a closed configuration.
FIG. 10 is a three-dimensional view of the hopper of FIG. 9 with the passage holes in an open configuration.
FIG. 11 is a three-dimensional view of the hopper and of the housing compartment in the second embodiment.
FIG. 12 is a three-dimensional bottom view of the hopper inserted in the housing compartment according to some embodiments described here.

The reciprocal rotation between container 18 and closing device 24, as mentioned above, also determines the opening/closing of the lower aperture 21. In particular, the lower aperture 21 is open when the clamping members 31 are in the active position and clamping the hopper 14 in the housing compartment 12 (FIGS. 1, 6 and 10), while the lower aperture 21 is closed when the clamping members 31 are in the inactive position (FIGS. 2, 5 and 9).

In this way, it is guaranteed that the hopper 14 can be removed only when the lower apertures 21 are closed, thus preventing unwanted spillages of the products to be ground.

According to one possible embodiment, for example described with reference to FIGS. 3-7, the clamping members 31 can be associated with the closing device 24, that is, be connected to it and be configured to assume a retracted inactive position in which they allow the extraction of the hopper 14 and a protruding active position in which they clamp the hopper 14.

According to some embodiments, the clamping members 31 comprise at least one mobile pin 32 which, in the retracted inactive position is positioned inside the closing device 24, and in the protruding active position it at least partly exits from the closing device 24.

According to these embodiments, at least one slot 37 is made in the lateral wall 26 to allow the passage through it of at least part of the pin 32.

The pin 32 can be constrained to slide along a guide 33, which is conformed in such a way as to make it follow a roto-translation trajectory.

The pin 32 can be provided at the lower part with a sliding seating 36 having a shape mating with the guide 33 and suitable to receive the latter. In this way, the pin 32 is positioned astride the guide 33.

The guide 33 comprises a first substantially circular segment 34, having a first diameter, and a second segment 35, located in continuity with the first segment 34, which has a substantially circular development, with a larger diameter than the first.

Along the guide 33 there can be provided start and/or end of travel elements against which the pins 32 can abut in one and/or the other of the respective retracted and protruding positions.

According to some embodiments, the first segment 34 can extend in the proximity of an external edge of a through hole 27, substantially following its development and, in the retracted position, the pins 32 are partly positioned above the through holes 27.

If at least part of the bottom wall 22 is made of transparent material, this allows, in certain circumstances and/or with specific conformations of the bottom, to visually check the correct positioning of the pins 32 with respect to the through holes 27 before proceeding with filling the container 18.

During the translation of the pin 32 along the guide 33, when the pin 32 is in the first, innermost segment 34, it remains inside the volume defined by the lateral wall 26, while when it advances along the second segment 35, as well as rotating around the central axis Y, it also moves progressively in the radial direction with respect to it, until it partly exits from the lateral wall 26 through the slot 37.

According to some embodiments, two pins 32 can be provided, each constrained to slide on a special guide 33, and each configured to pass through a respective slot 37 and cooperate with a respective clamping seating 38 provided in the housing compartment 12.

According to some embodiments, the bottom wall 22 of the container 18 can be provided with one or more shaped cavities 39, having a shape mating with the shape of the pins 32, and each suitable to house one of them, making a same shape coupling.

When the container 18 and the closing device 24 are axially connected to each other, the pins 32 are each positioned in a respective shaped cavity 39.

The lower portion 19b of the container 18, moreover, in correspondence with each shaped cavity 39, can be provided with a slit 40 configured to allow the passage through it of at least part of the pin 32.

Figures 3, 3A, 4:
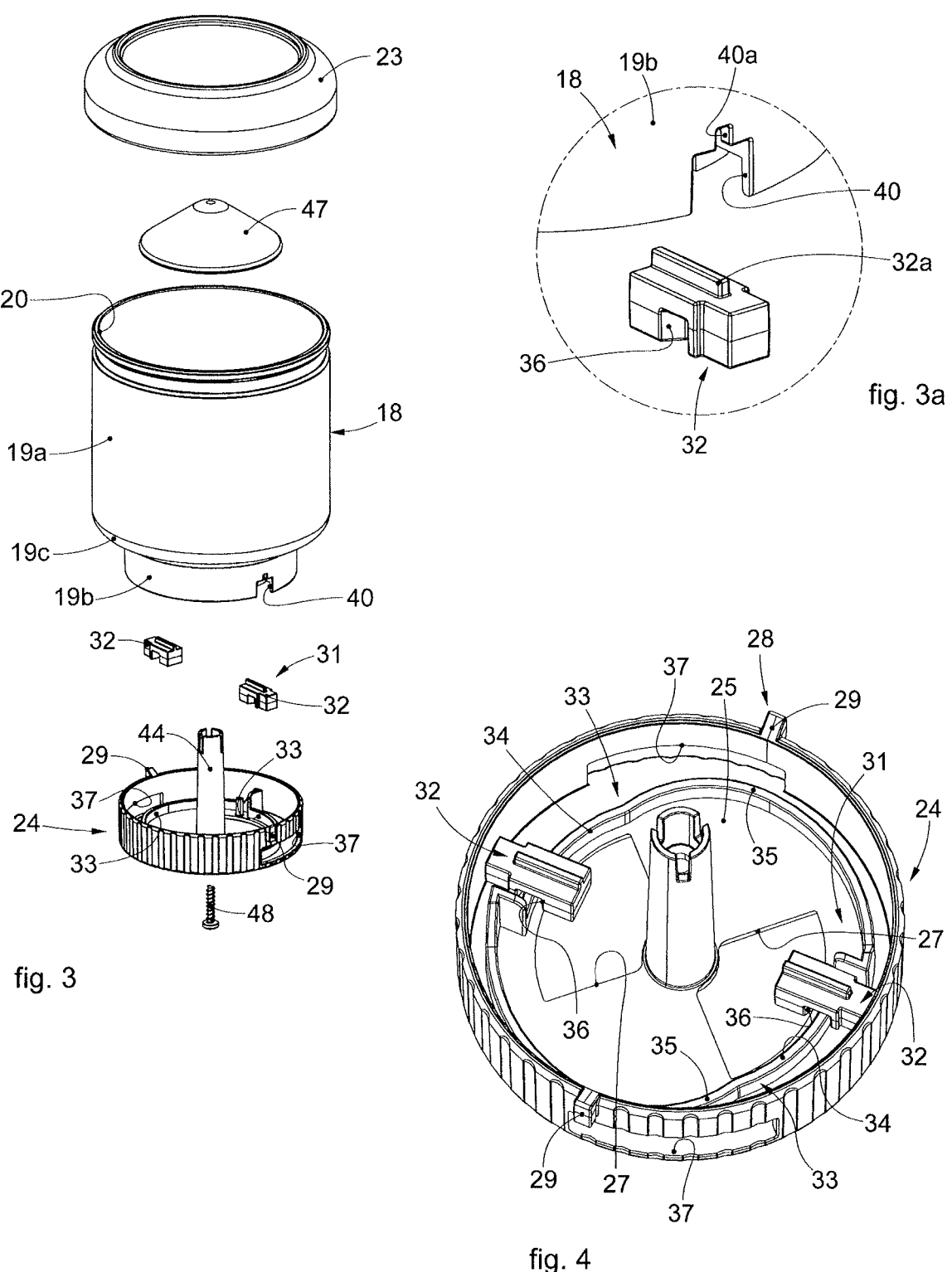
FIG. 3 is an exploded view of the components of the hopper according to a first embodiment.
FIG. 3a is an enlarged detail of FIG. 3.
FIG. 4 is a three-dimensional top view of a component of FIG. 3.

The pins 32 and the slits 40 can be provided with respective protrusions 32a and recesses 40a suitable to define a sliding guide for the pins 32 in a radial direction along the X axis (FIG. 3a).

According to one possible variant, for example shown in FIGS. 9-11, the clamping members 31 can be associated with the container 18 and integral therewith.

According to this variant, the clamping members 31 can be configured to make a bayonet type coupling with respective clamping seatings 138 provided in the housing compartment 12.

The clamping members 31 can comprise at least one pin 132, in the case shown two pins 132, protruding radially with respect to the lower portion 19b of the container 18.

According to this variant, the closing device 24 comprises at least one through slot 137 made in the lateral wall 26, configured to allow the pin 132 to transit through it.

According to this embodiment, the housing compartment 12 comprises a guide groove 133 which extends between an insertion portion 134 and the clamping seating 138, which act respectively as start and end of travel positions.

The insertion portion 134 is provided with a recess 135, which defines a space through which the pin 132 can be inserted and transit in an axial direction, parallel to the central axis Y.

According to some embodiments, the insertion portion 134 can be disposed offset with respect to the cavity 30 so as not to interfere with it.

According to some embodiments, the grinding device 10 comprises at least one presence detection device 41 configured to detect the presence of the hopper 14 inside the housing compartment 12.

The presence detection device 41 can be configured to detect the presence of the hopper 14 when the coupling members 28 are reciprocally engaged with each other.

For example, the presence detection device 41 can be activated when a fin 29 is inserted into a respective cavity 30.

In this case, the presence detection device 41 can be a microcontroller, or a sensor of the mechanical type, located in correspondence with the cavity 30 and activated directly by the fin 29 or indirectly by means of a return element 42.

According to possible variants, it can be a sensor of the magnetic or capacitive type, suitable to interact with suitable identification means provided in the respective fin 29, for example a magnet, or other.

The presence detection device 41 can be connected to a control and command unit of the grinding device 10, not shown, configured to regulate the functioning of the grinding device 13, and in particular to command and allow the functioning of the grinding means 13 only if the hopper 14 is present, guaranteeing the safety of the user.

Providing a detection device 41 dedicated solely to detecting the presence of the hopper 14 advantageously allows to be able to drive the grinding means 13 without needing to open the lower apertures 21, so as to consume the products to be grinded present inside the grinding chamber 16 before feeding the new products, preventing mixes and contaminations between them.

According to some embodiments, the grinding device 10 also comprises at least one state detection device 43 configured to detect when the lower apertures 21 are in at least one of either the open position or the closed position.

According to some embodiments, the device for detecting the opened/closed state 43 can be disposed in correspondence with at least one clamping seating 38, 138 and be configured to be activated by the insertion of a respective clamping member 31, for example a pin 32, 132, in such clamping seating 38, 138 when the clamping member 31 is in its active position, so as to detect the completely opened condition.

The state detection device 43 can be chosen, for example, from a Hall effect sensor, a magnetic sensor, suitable to receive a respective signal when located in the proximity of a pin 32 having suitable identification means, or a sensor of the mechanical type that can be activated by contact, or others.

According to some variants, the state detection device 43 can be configured to detect both the completely opened state and also the completely closed state of the lower apertures 21.

According to possible solutions, there can be provided two or more state detection devices 43a, 43b, or sensors, connected to a same detection device, configured to detect when a respective pin 32, 132 is in the respective start and end of travel positions, or possibly in an intermediate position.

For example, with reference to FIG. 12, a first state detection device 43a can be positioned in correspondence with the bottom end of the clamping seating 138, while a second state detection device 43b can be positioned in correspondence with the insertion seating 133 to detect when a respective pin 132 is positioned therein.

In the case in which the clamping members 31 are associated with the closing device 24, there can be provided a first state detection device 43a in a clamping seating 38 to detect the completely opened state of the lower apertures 21, and a second state detection device 43b disposed in the housing compartment 12 in the proximity of the retracted inactive position of the pins 32 in order to detect the completely closed state.

Providing to detect both the opened and closed states guarantees an effective functioning of the apparatus 10, preventing intermediate positions which on the one hand do not allow to adequately feed the grinding means 13 and on the other hand do not guarantee the correct closure of the lower apertures 21 before the hopper 14 is removed from the housing compartment 12.

The state detection devices 43, 43a, 43b, can be configured to transmit the data detected to the control and command unit, which can determine the functioning of the grinding device 10 also as a function of the data received from them. The control and command unit can be configured to signal to the user, for example by means of an interface, or with sound signals, a possible incorrect positioning of the hopper 14, inviting the user to complete the rotation of the container 18 toward the start or end of travel position.

Some embodiments described here also concern a method to insert and clamp the hopper 14 in the containing body 11.

The method provides to insert the hopper 14 in the housing compartment 12 along the central axis Y, coupling the respective coupling members 28, in particular inserting the fins 29 in the respective cavities 30. In this way, the closing device 24 is attached in the housing compartment 12 preventing its rotation with respect thereto.

The insertion of the fins 29 in the cavities 30 determines the activation of the presence detection device 41, allowing the possible start of the grinding means 13 to grind any products present in the grinding chamber 16, before feeding the new products present in the container 18. The method also provides to rotate the container 18 with respect to the closing device 24, for example in a clockwise sense, in such a way as to drive the clamping members 31 and take them from the inactive position to the active position, so as to engage them with the clamping seatings 38, 138 present in the housing compartment 12.

The rotation of the container 18 with respect to the closing device 24 simultaneously also involves the opening of the lower apertures 21, allowing the products in the container 18 to fall by gravity into the grinding chamber 16.

According to the first embodiment (FIGS. 5-8) the rotation of the container 18 involves the translation of the pins 32 along the respective guides 33, with consequent rotation around the central axis Y and translation in a radial direction X, until they exit with respect to the lateral wall 26 of the closing device 24.

In the case of the second embodiment (FIGS. 9-11), when the hopper 14 is inserted in the housing compartment 12, the fins 29 engage with the respective cavities 30, preventing the rotation of the closing device 24, and the pins 132 are inserted in the guide groove 133 through the insertion seating 134.

The rotation of the container 18, for example in a clockwise sense, involves the sliding of the pins 132 along the guide 133, taking them from the inactive position in correspondence with the insertion seating 134 to the active position in correspondence with the clamping seatings 138.

According to some embodiments, the engagement between a pin 32, 132 and a respective clamping seating 38, 138 automatically determines the activation of a device for detecting the opened/closed state 43, 43a, indicative of the fact that the lower apertures 21 are completely open.

When the removal of the hopper 14 from the containing body 11 is required, it is sufficient to carry out the same operations in the opposite sense, that is, rotation of the container 18 with respect to the closing device 24 in a counterclockwise sense and subsequent extraction of the hopper 14 in an axial direction.

In the first embodiment, the rotation of the container 18 in the opposite sense involves the translation of the pins 32 from the protruding position to the retracted position, where they do not interfere with the housing compartment 12, and the simultaneous closing of the lower apertures 21.

In the second embodiment, the rotation of the container 18 involves the sliding of the pins 132 along the guide 133 until they reach the inactive position in correspondence with the insertion seating 134.

According to some embodiments, it can be provided to detect a state of complete closure of the lower apertures 21 by means of a state detection device 43, 43b disposed in the housing compartment 12, configured to have arrived from one of the clamping members 31, 32, 132 when it is in correspondence with or in the proximity of an inactive, or start of travel, position thereof.

The subsequent extraction of the hopper 14 in the axial direction involves the deactivation of the presence detection device 41 and therefore the inhibition of the grinding means 13 by the control and command unit, in such a way as to ensure the safety of the user.

Advantageously, all operations can be performed by grasping the container 18 from the outside, in a practical, fast, and hygienic manner.

It is clear that modifications and/or additions of parts or steps may be made to the grinding device 10 and to the insertion and extraction method as described heretofore, without departing from the field and scope of the present invention as defined by the claims.

In the following claims, the sole purpose of the references in brackets is to facilitate reading: they must not be considered as restrictive factors with regard to the field of protection claimed in the specific claims.

The invention claimed is:

1. A grinding device for grinding food products, comprising:
  a housing compartment;
  grinding means; and
  a hopper removably associated with said housing compartment;
  wherein said hopper comprises a container having at least one selectively openable and closable lower aperture;
  wherein said hopper comprises a closing device, rotatable with respect to said container, said closing device comprising first coupling members configured to engage in an axial direction with mating second coupling members provided in said housing compartment;
  wherein said hopper also comprises clamping members, configured to assume a first inactive position in which said clamping members do not interfere with said housing compartment and allow removal of said hopper, and a second active position in which said clamping members engage with mating clamping seatings provided in said housing compartment clamping said hopper therein;
  wherein said clamping members are constrained to said container and are driven by said container's rotation, in a clamped position of said hopper said lower aperture being aligned with a respective through hole provided in said closing device to allow passage of food products toward said grinding means; and
  wherein said closing device comprises at least one slot made in a lateral wall, wherein at least part of said clamping members are positioned within the at least one slot through said lateral wall.

2. The grinding device as in claim 1, wherein said clamping members are associated with said closing device and are configured to assume said first inactive position in which said clamping members are positioned inside said closing device, and said second active position in which said clamping members protrude radially from said closing device and engage in said clamping seatings.

3. The grinding device as in claim 2, wherein said clamping members comprise at least one pin slidable along a guide which is conformed in such a way as to make said pin follow a roto-translation trajectory and comprising a substantially circular first segment, having a first diameter, and a substantially circular second segment, located in continuity with the first segment but with a larger diameter.

4. The grinding device as in claim 1, wherein said clamping members are associated with said container and are configured to make a bayonet-type coupling with said clamping seatings, and wherein said clamping members comprise at least one pin protruding radially with respect to a lower portion of said container.

5. The grinding device as in claim 1, further comprising a device for detecting a presence of said hopper in said housing compartment which is disposed in correspondence with at least one of said second coupling members and is configured to be activated by at least one of said first coupling members engaged with it.

6. The grinding device as in claim 5, further comprising a control and command unit connected to a presence detection device and to said grinding means, and configured to allow the activation of said grinding means only when said hopper is present in said housing compartment.

7. The grinding device as in claim 1, further comprising at least one device for detecting an opened/closed state of said lower aperture, disposed in correspondence with at least one of said clamping seatings and configured to be activated by at least one of said clamping members cooperating with said clamping seating in said active position.

8. The grinding device as in claim 1, further comprising a device for detecting an opened/closed state of said lower aperture, located in proximity of, or in correspondence with, an inactive or start of travel position of at least one of said clamping members and configured to be activated by said at least one of said clamping members when it is in said inactive or start of travel position.

9. A method to insert said hopper of said grinding device as in claim 1 in said housing compartment of said grinding device, said method comprising:

inserting said hopper in said housing compartment along a central axis, with said clamping members kept in said inactive position, until said first coupling members are coupled with said second coupling members; and rotating said container with respect to said closing device and said housing compartment around the central axis in order to drive said clamping members and take them to said active position, so as to engage them with said clamping seatings, clamping said hopper in said housing compartment and at the same time opening said lower aperture to allow products to be ground to be fed from said container to said grinding means.

10. The insertion method as in claim 9, further comprising detecting a presence of said hopper when the coupling between said coupling members occurs, consequently enabling a functioning of said grinding means before the rotation of said container.

11. The insertion method as in claim 9, further comprising detecting an opening of said lower aperture when the engagement between said clamping members and said clamping seatings occurs.

12. A method to extract said hopper of said grinding device as in claim 1 from said housing compartment of said grinding device, said method comprising:

rotating said container with respect to said closing device and said housing compartment around a central axis in order to drive said clamping members and take them from said active position to said inactive position, so as to disengage them from said clamping seatings, unclamping said hopper and at the same time closing said lower aperture to prevent products to be ground from being fed from said container to said grinding means; and extracting said hopper from said housing compartment along said central axis, with said clamping members maintained in said inactive position, until said first coupling members are decoupled from said second coupling members.

13. The extraction method as in claim 12, further comprising detecting an absence of said hopper when decoupling between the coupling members occurs, consequently disabling a functioning of said grinding means.

14. The extraction method as in claim 12, further comprising detecting a complete closure of said lower aperture when said clamping members are in correspondence with an inactive or start of travel position in said housing compartment.

15. A machine to prepare coffee beverages comprising said grinding device as in claim 1, wherein said grinding means are integrated inside a containing body thereof and said hopper is removably associated with said machine.

* * * * *